United States Patent Office 2,978,359
Patented Apr. 4, 1961

2,978,359
PREPARATION OF HARDENABLE WATER SOLUBLE CONDENSATION PRODUCTS AND FINISHING OF TEXTILE FABRICS THEREWITH

Hans Wedell, Dusseldorf-Holthausen, Germany, assignor to Böhme Fettchemie G.m.b.H., Dusseldorf, Germany, a corporation of Germany No Drawing. Filed Dec. 21, 1955, Ser. No. 554,401

Claims priority, application Germany Dec. 22, 1954

8 Claims. (Cl. 117—138.8)

This invention relates to textile finishing agents and various methods of producing them. More particularly, the invention relates to resinous stiffening agents for textiles which are based upon water-soluble, hardenable aldehyde precondensate resins.

It is well known that water-soluble, hardenable precondensate resins can be produced from oxo-compounds and organic nitrogen compounds comprising amino-groups or imino-groups. For example, by subjecting a mixture of formaldehyde and urea or melamine and the like to a condensation reaction, water-soluble resinous condensation products are produced which have been advantageously used as casting resins, as adhesives in the manufacture of plywood and as textile finishing agents. It is further known to react such resinous condensates with water-soluble sulfites, whereby a sulfonic group is introduced into the resin molecule. The introduction of the sulfonic group brings about an improvement of the physical and chemical properties of the resinous condensation products. However, the properties of such modified resins are not sufficiently improved with respect to some fields of application, particularly for their use as textile stiffening agents.

It is therefore an object of the present invention to provide water-soluble, hardenable precondensate resins with improved properties, particularly with improved water-solubility.

Another object of the present invention is to provide textile finishing agents with improved properties, particularly with improved resistance to laundering.

Still other objects and advantages of the present invention will become apparent as the description thereof proceeds.

I have found that water-soluble, hardenable resinous condensation products with considerably improved physical and chemical properties are obtained if precondensates of oxo-compounds, organic nitrogen compounds comprising amino-groups or imino-groups and water-soluble sulfites are further condensed with polyhydroxy or polyamide compounds. Thus, the condensation products of the present invention are formed by a condensation reaction involving four components, namely (1) a condensable organic nitrogen compound comprising amino-groups or imino-groups, (2) an oxo-compound, (3) a water-soluble salt of sulfurous acid and (4) a water-soluble, high-molecular polyhydroxy or polyamide compound.

Organic nitrogen compounds comprising amino-groups or imino-groups which are suitable for this purpose are primarily urea, thiourea, methylenediurea, acetylenediurea, cyanamide, guanidine, alkylguanidines, dicyandiamide, dicyandiamidine, melamine and other condensable nitrogenous organic compounds.

Oxo-compounds which may advantageously be used in forming the improved precondensates in accordance with the invention are primarily lower aldehydes, such as acetaldehyde and formaldehyde, compounds yielding aldehydes, as well as acrolein, glyoxal, furfural, methylethyl ketone and other oxo-compounds.

Suitable water-soluble salts of sulfurous acid are alkali metal sulfites, ammonium sulfites and the corresponding bisulfites and pyrosulfites.

Examples of water-soluble, high-molecular polyhydroxy compounds which may be employed to produce the improved resinous precondensates according to our invention, are polysaccharides and their derivatives, such as starch, dextrin, pectins, alginic acid salts, alkylated cellulose compounds, especially methyl cellulose, oxyethyl cellulose, carboxymethyl cellulose and polyvinyl alcohol.

Examples of suitable water-soluble, high-molecular polyamide compounds are glue, gelatins, casein, albumin and other albuminous substances, cleavage products of albumin and degradation products of albumin in various stages of degradation. Similarly, polyamide compounds may be used which are produced by a condensation reaction between albumin or cleavage products of albumin and fatty acid chlorides or high-molecular sulfochlorides.

The novel condensation products are produced from the above four starting components in accordance with our invention by condensing a mixture of these components at temperatures of about 50°–110° C. and a pH-value between 4 and 10, or by first producing precondensates from two or more of the above-described components, and subsequently subjecting the precondensates to a further condensation reaction with the remaining components.

By a variation of the individual condensation components and by changing the quantitative ratio of these components, the physical and chemical properties of the condensation products and the resins obtained therefrom by a suitable hardening treatment, may be varied within wide limits. For example, a variation of these factors will bring about a change in one or more of the following properties: pliability, water-solubility, hardness, adhesive power and so forth. Thus, the process according to the present invention makes it possible to produce resinous products capable of use for a great variety of purposes and having properties most eminently suited for the particular intended purpose.

A further improvement in the properties of the above precondensates, which may be very advantageous for some practical purposes, can be brought about by incorporating into the precondensates a substance comprising high-molecular lipophilic radicals. If this substance contains condensable groups, such as hydroxyl- or amino-groups, it may be included in the condensation reaction. However, the substance added to the precondensate may also be one which does not react with the other components under the condensation conditions, such as fats, waxes, or hydrocarbons, especially paraffin. In this manner the physical properties of the precondensates produced from the above four components can be varied in a great variety of ways.

The precondensates produced in accordance with the present invention are readily soluble in water. This was by no means obvious, because casein reacts with formaldehyde, for example, to form completely insoluble products. Furthermore, aqueous solutions of starch or methyl cellulose very rapidly form insoluble precipitates when formaldehyde or urea-formaldehyde precondensates are added to such solutions.

The water-soluble precondensates above described are readily converted into insoluble resins in the usual manner, for example by a heat treatment or also by adding acid condensation promoters thereto.

The following examples will further illustrate the nature and method of obtaining the precondensates according to this invention, without any intention, however, of limiting my invention to these examples.

Example I 430 cc. of a 40% aqueous formaldehyde solution were adjusted to a pH of 8.2 to 8.4 with a hot concentrated solution of sodium sulfite. 170 gm. of melamine were added to this solution and the mixture was then heated for 25 minutes at 80° C., accompanied by vigorous stirring. A clear solution of methylol melamine was formed. A hot homogeneous syrup was added to this clear solution, said syrup having been produced by dissolving 75 gm. sodium sulfite and 30 gm. sodium alginate in 275 cc. water. The reaction mixture was adjusted to a pH-value of 8.0 with glycolic acid and thereafter stirred for 90 minutes at 85–90° C. A translucent highly water-soluble paste was formed.

Example II 205 cc. of a 40% aqueous formaldehyde solution were adjusted to a pH-value of 7.5 with sodium hydroxide. Thereafter 80 gm. of urea and a paste which was prepared from 15 gm. methyl cellulose and 100 cc. water were added to the solution. The mixture was then heated to 75° C. while stirring, and allowed to remain at this temperature for 10 minutes while continuing to stir. 20 gm. sodium metabisulfite were then added and the mixture was further stirred at 75° C. until the salt completely dissolved. Thereafter the pH of the reaction solution was adjusted to 5.9–6.1 and the solution was stirred for 1 hour at 95–98° C. The solution was then neutralized. After cooling, the reaction product formed a lard-like paste which remained stable over long periods of time in storage.

Example III 540 cc. of a 40% aqueous formaldehyde solution were adjusted to a pH-value of 8.0 with a concentrated sodium sulfite solution. 100 gm. of thiourea and 100 gm. urea were added to this solution and the mixture was then heated for 5 minutes to 75° C. Thereafter a suspension of 200 gm. of degraded starch in a solution of 60 gm. sodium pyrosulfite in 260 cc. of water were added to this mixture. The resulting solution had a pH-value of 7.0 and was now heated for 30 minutes to 90° C. Thereafter the pH-value was reduced to 6.2 with glycolic acid and the solution was stirred for 60 minutes at 95–98° C. Finally, the pH-value was adjusted to 7.2. After cooling, the reaction product formed a highly viscous paste which was very soluble in hot water.

Example IV 60 gm. polyvinyl alcohol were slowly stirred into 600 cc. of a 40% formaldehyde solution (pH=9.0). The mixture was then stirred for half an hour, admixed with 300 gm. urea and then stirred for 15 minutes more without further heating. Thereafter the solution was heated to 80° C. within 20 minutes and a solution of 60 gm. sodium pyrosulfite and 15 gm. sodium sulfite in 100 cc. water were added thereto. The pH-value of the resin solution was then adjusted to 6.0 and the temperature was increased to 95–98° C. The reaction mixture was then stirred for 1 hour, neutralized with sodium hydroxide and allowed to cool. The reaction product formed a clear syrup which is readily soluble in water.

Example V 350 gm. dextrine were stirred into 210 cc. water, then dissolved therein by heating the mixture (solution 1). A solution of 200 gm. dicyandiamide in 580 cc. of 40% formaldehyde (pH 7.5) was heated for 30 minutes to 80° C. (solution 2). Thereafter solution 1 was added to solution 2, 60 gm. sodium pyrosulfite were added to the mixed solutions and the pH value of the reaction mixture was adjusted to 6.0. The reaction mixture was then stirred for 1 hour at 90° C., neutralized and allowed to cool. The reaction product formed a yellowish-brown syrup which was readily soluble in water.

Example VI

A mixture of 80 gm. dextrine, 10 gm. sodium alginate, 60 gm. degraded starch and 30 gm. of the triethanolamine salt of a phosphoric acid octadecyl ester was stirred into 300 cc. water over a period of 1 hour at 80° C. (solution 1). A mixture of 142 gm. acetylene diurea and 300 cc. of a 30% solution of formaldehyde (pH 9.0) was heated to 70° C. for 30 minutes and then admixed with 45 gm. sodium pyrosulfite. Solution 1 was then added thereto, the pH-value of the mixture was adjusted to between 6.8 and 7.2 and it was then stirred for 1 hour at 90° C. After cooling, a lard-like paste was formed which could be readily dissolved in water.

Example VII

In a hot solution of 150 gm. urea and 50 gm. sodium sulfite in 200 cc. water whose pH value had been adjusted to 8.0 with acetic acid, 120 gm. acid casein were slowly suspended by vigorous stirring. When the mixture formed a cloudy homogeneous solution, 400 gm. of a 40% formaldehyde solution (pH 7.4) were added thereto, the pH-value of the reaction mixture was adjusted to 7.8 and it was then stirred for 1 hour at 90° C. Thereafter 100 gm. of solid paraffin (melting point 40° C.) were added to the reaction mixture and it was stirred for another half hour at 90° C. Subsequently the reaction mixture was allowed to cool to room temperature while continuously stirring. The reaction product formed a thick emulsion which oculd be readily diluted with warm water.

As indicated above, water-soluble or water-dispersable precondensates produced from urea, melamine or other nitrogenous compounds containing amino-groups or imino-groups and oxo-compounds, such as formaldehyde, have long been used as textile finishing agents, particularly as textile stiffening agents. Similarly, it is well known that water-soluble, hardenable precondensates comprising sulfonic groups, produced by subjecting urea, thiourea, melamine or the like and formaldehyde or other aldehydes to a condensation reaction in the presence of a water-soluble sulfite, are useful as textile impregnating agents. However, the effects achieved thereby, particularly with respect to the stiffness and fullness of the finished textile material, are not entirely satisfactory; in fact, the finished fabric has a flimsy, only moderately stiff feel. Finally, in order to improve the feel of fabrics finished in this known manner, the finishing solutions containing the stiffening agent have heretofore been modified with dextrin, starch and the like, but the finished textile lost its initial satisfactory stiffness after only a few washings. Thus, the prior art has failed to disclose means or methods for rendering textiles full and stiff, and to provide stiffening agents which will be retained in the fabric despite repeated washings.

I have found that finished textile fabrics with extraordinary stiffness and fullness are obtained, and that these fabrics will retain these desirable qualities even after repeated washings, if the fabrics are impregnated or otherwise treated with aqueous solutions of the hardenable precondensates above described and produced, in accordance with this invention, by subjecting a condensable nitrogenous organic compound comprising amino-groups and imino-groups, an oxo-compound, a water-soluble salt of sulfurous acid and a water-soluble, high-molecular polyhydroxy and/or polyamide compound to a condensation reaction in the presence of each other. Similarly, solutions of such precondensates further condensed or admixed with compounds comprising a lipophilic radical will produce equally excellent results.

The aqueous solutions above referred to preferably contain the precondensates in amounts ranging from 30 to 300 gm./liter. In order to achieve a precipitation and deposition of the resin on the textile fiber, 4 to 6 gm./liter of an acid-yielding hardener, such as ammonium nitrate or ammonium stearyl phosphate, are added to the solution.

A particularly advantageous method of finishing textile fabrics with such solutions comprises impregnating the textile fabric with the solution, for example by immersion, spraying or doctoring, subsequently removing the excess solution by squeezing or centrifuging the impregnated fabric until it contains no more than about 100% of its dry weight of solution, and finally drying the wet fabric at elevated temperatures. The resistance to laundering of the textile finish thus produced is particularly good if the wet fabric is dried in two stages, for example, by drying the fabric first at about 70° C. and afterwards subjecting the substantially dry fabric to a short heat treatment at 110° to 170° C.

In general, fabrics made of regenerated cellulose are most eminently suitable for the finishing treatment herein described, but the process may also be applied with good success to other types of textiles, for example to fabrics made of acetyl cellulose, cotton, wool, silk, nylon or perlon.

Fabrics treated in the manner above described are imparted not only with fullness and stiffness, but also with soil-resisting properties.

The following examples will further illustrate the method of finishing textile fabrics in accordance with the present invention and will enable others skilled in the art to understand my invention more completely.

*Example VIII*

An apparel fabric made of regenerated cellulose was slop-padded at 20–30° C. in a solution containing 100 gm. per liter of a mixed condensate of sodium pyrosulfite, sodium alginate, dextrine, soluble starch, acetylene diurea and formaldehyde, the production of which is described in Example VI, as well as 4 gm. ammonium chloride. The fabric was squeezed to remove the excess solution and then dried at 120° C. The fabric obtained by this treatment was imparted with a full, stiff feel which was retained even after several launderings.

*Example IX*

Regenerated cellulose muslin was slop-padded as in Example VIII with a solution which contained 10 gm. per liter ammonium stearyl phosphate and 120 gm. per liter of a mixed condensate produced in accordance with Example VII from sodium sulfite urea, casein and formaldehyde and with the addition of paraffin. The fabric was squeezed, then pre-dried at 70° C. and subsequently heated for 5 minutes at 130° C. to harden the resin. It had a full, very soft feel and water-repellent properties. The finish was extraordinarily resistant to laundering.

*Example X*

Perlon undergarment material was impregnated with a solution which contained 200 gm. per liter of a mixed condensate of dextrine, urea, sodium pyrosulfite and formaldehyde, as well as 5 gm. per liter ammonium oleyl sulfate. The excess liquid was removed by suction and the fabric was subsequently dried at 100° C. to harden the resin. The finished material had a soft, full feel and a good degree of stiffness, which was retained even after 10 mild launderings.

While I have given various specific embodiments of my invention, it will be obvious to those skilled in the art that various changes and modifications may be made therein without departing from the spirit of the invention or the scope of the appended claims.

I claim:
1. The process of producing water-soluble, hardenable condensation products adapted for use as textile-finishing agents, which comprises subjecting a mixture composed of (1) from 6.9% to 16.0% by weight of a water-soluble salt of sulfurous acid selected from the group consisting of alkali metal sulfites, ammonium sulfites and the corresponding bisulfites and pyrosulfites, (2) from 23.0% to 42.6% by weight of an organic nitrogenous compound containing groupings selected from the group consisting of amino-groups and imino-groups, said nitrogenous compound selected from the group consisting of urea, thiourea, methylenediurea, acetylenediurea, cyanamide, guanidine, alkylguanidines, dicyandiamide, dicyandiamidine, melamine and methylol melamine, (3) from 20.9% to 44.5% by weight of an oxo compound with the proviso that said oxo compound is in sufficient quantity to provide 0.6 mol of equivalent oxo compound for each amino-group and imino-group in the nitrogenous compound, said oxo compound selected from the group consisting of formaldehyde, acetaldehyde, acrolein, glyoxal, furfural and methyl ethyl ketone, and (4) from 6.4% to 40.2% by weight of a water-soluble, condensable compound containing a plurality of atom-groups selected from the group consisting of hydroxy-groups and amide-groups, said condensable compound selected from the group consisting of starch, dextrine, pectin, alkali metal alginates, hydroxyethyl cellulose, methyl cellulose, carboxymethyl cellulose, glue, gelatine, casein, albumin, and polyvinyl alcohol to a condensation reaction in aqueous solution at a temperature between 50 and 110° C. and at a pH of 4 to 10.

2. The process of producing a water-soluble, hardenable condensation product adapted for use as a textile finishing agent, which comprises subjecting a mixture composed essentially of 16.0% by weight of sodium sulfite, 36.3% by weight melamine, 41.3% by weight of formaldehyde, and 6.4% by weight sodium alginate, to a condensation reaction in aqueous solution at a temperature between 80 and 90° C. and at a pH of 8.0 to 8.4.

3. The process of producing a water-soluble, hardenable condensation product adapted for use as a textile finishing agent, which comprises subjecting a mixture composed essentially of 9.7% by weight sodium metabisulfite, 38.6% by weight urea, 44.5% by weight of formaldehyde, and 7.2% by weight methyl cellulose, to a condensation reaction in aqueous solution at a temperature between 75 and 98° C. and at a pH of 5.9 to 7.5.

4. The process of producing a water-soluble, hardenable condensation product adapted for use as a textile finishing agent, which comprises subjecting a mixture consisting essentially of 10.7% by weight of a mixture of sodium sulfite and sodium pyrosulfite, 42.6% by weight urea, 38.2% by weight of formaldehyde and 8.5% by weight polyvinyl alcohol, to a condensation reaction in aqueous solution at a temperature between 80 and 98° C. and at a pH of 6.0 to 9.0.

5. The process of producing a water-soluble, hardenable condensation product adapted for use as a textile finishing agent, which comprises subjecting a mixture consisting essentially of 6.9% by weight sodium pyrosulfite, 23.0% by weight dicyandiamide, 29.9% by weight formaldehyde and 40.2% by weight dextrine, to a condensation reaction in aqueous solution at a temperature between 80 and 90° C. and at a pH of 6.0 to 7.5.

6. The process of producing a water-soluble, hardenable condensation product adapted for use as a textile finishing agent, which comprises subjecting a mixture consisting essentially of 8.3% by weight sodium sulfite, 25.0% by weight urea, 30.0% by weight formaldehyde and 20.0% by weight casein, to a condensation reaction in aqueous solution at a temperature of about 90° C. and at a pH of about 7.8 to 8.0.

7. The method of finishing textile fabrics, which comprises impregnating such fabrics with an aqueous solution comprising from 30 to 300 gm./liter of a hardenable, water-soluble mixed condensate produced by subjecting a mixture composed of (1) from 6.9% to 16.0% by weight of a water-soluble salt of sulfurous acid selected from the group consisting of alkali metal sulfites, ammonium sulfites and the corresponding bisulfites and pyrosulfites, (2) from 23.0% to 42.6% by weight of an organic nitrogenous compound containing groupings selected from the group consisting of amino-groups and imino-groups, said nitrogenous compound selected from the group consisting of urea, thiourea, methylenediurea, acetylenediurea, cyanamide, guanidine, alkylguanidines, dicyandiamide, dicyandiamidine, melamine and methylol melamine, (3) from 20.9% to 44.5% by weight of an oxo compound with the proviso that said oxo compound is in sufficient quantity to provide 0.6 mol of equivalent oxo compound for each amino-group and imino-group in the nitrogenous compound, said oxo compound selected from the group consisting of formaldehyde, acetaldehyde, acrolein, glyoxal, furfural and methyl ethyl ketone, and (4) from 6.4% to 40.2% by weight of a water-soluble, condensable compound containing a plurality of atom-groups selected from the group consisting of hydroxy-groups and amide-groups, said condensable compound selected from the group consisting of starch, dextrine, pectin, alkali metal alginates, hydroxyethyl cellulose, methyl cellulose, carboxymethyl cellulose, glue, gelatin, casein, albumin, and polyvinyl alcohol to a condensation reaction in aqueous solution at a temperature between 50 and 110° C. and at a pH of 4 to 10, removing excess solution from the impregnated fabric, and drying the wet fabric at a temperature between 70 and 170° C.

8. The method of finishing textile fabrics, which comprises impregnating such fabrics with an aqueous solution comprising from 30 to 300 gm./liter of a hardenable, water-soluble mixed condensate produced by subjecting a mixture composed of (1) from 6.9% to 16.0% by weight of a water-soluble salt of sulfurous acid selected from the group consisting of alkali metal sulfites, ammonium sulfites and the corresponding bisulfites and pyrosulfites, (2) from 23.0% to 42.6% by weight of an organic nitrogenous compound containing groupings selected from the group consisting of amino-groups and imino-groups, said nitrogenous compound selected from the group consisting of urea, thiourea, methylenediurea, acetylenediurea, cyanamide, guanidine, alkylguanidines, dicyandiamide, dicyandiamidine, melamine and methylol melamine, (3) from 20.9% to 44.5% by weight of an oxo compound with the proviso that said oxo compound is in sufficient quantity to provide 0.6 mol of equivalent oxo compound for each amino-group and imino-group in the nitrogenous compound, said oxo compound selected from the group consisting of formaldehyde, acetaldehyde, acrolein, glyoxal, furfural and methyl ethyl ketone, and (4) from 6.4% to 40.2% by weight of a water-soluble, condensable compound containing a plurality of atom-groups selected from the group consisting of hydroxy-groups and amide-groups, said condensable compound selected from the group consisting of starch, dextrine, pectin, alkali metal alginates, hydroxyethyl cellulose, methyl cellulose, carboxymethyl cellulose, glue, gelatin, casein, albumin, and polyvinyl alcohol to a condensation reaction in aqueous solution at a temperature between 50 and 110° C. and at a pH of 4 to 10, and a hardener selected from the group consisting of ammonium nitrate, ammonium stearyl phosphate, ammonium chloride and ammonium oleyl sulfate, removing excess solution from the impregnated fabric and drying the wet fabric at a temperature between 70 and 170° C.

References Cited in the file of this patent

UNITED STATES PATENTS

| | | |
|---|---|---|
| 2,238,839 | Watkins | Apr. 15, 1941 |
| 2,492,510 | Van Epps | Dec. 27, 1949 |